UNITED STATES PATENT OFFICE.

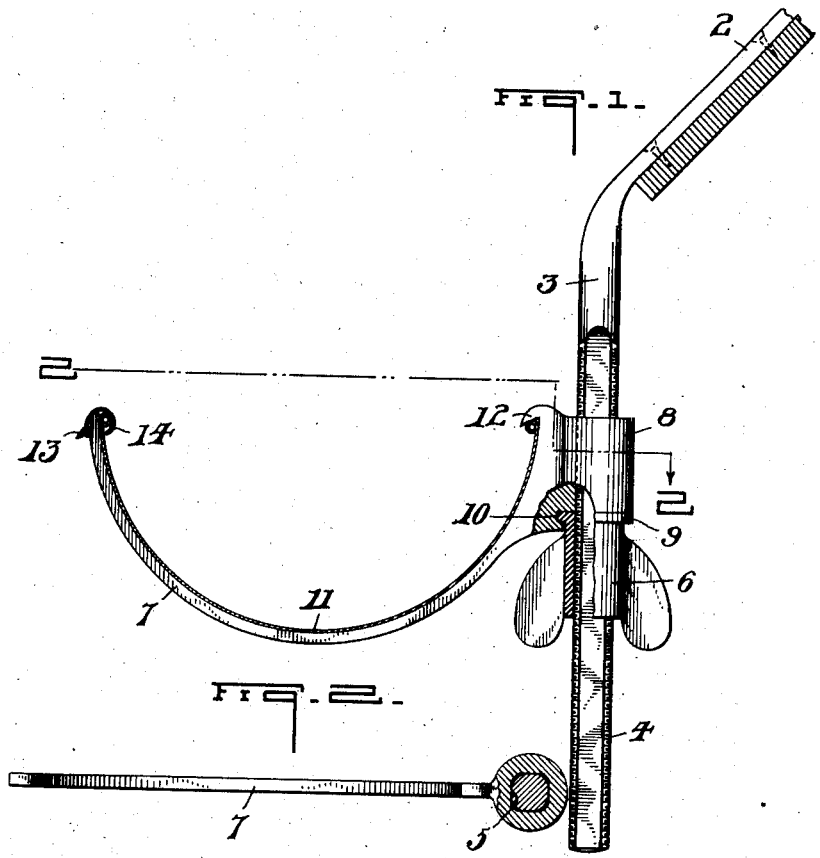

CHARLES C. LA CLARE, OF PITTSBURG, PENNSYLVANIA.

EAVES-TROUGH HANGER.

No. 894,019.   Specification of Letters Patent.   Patented July 21, 1908.

Application filed October 2, 1907. Serial No. 395,489.

*To all whom it may concern:*

Be it known that I, CHARLES C. LA CLARE, of Pittsburg, in the county of Allegheny and State of Pennsylvania, have invented certain new and useful Improvements in Eaves-Trough Hangers, of which the following is a specification.

An object of my invention is to provide a new and improved eaves trough hanger, and to this end my invention consists, in an eaves-trough hanger, in the novel features of construction and in the combination of parts all as herein described and claimed.

Further objects of the present invention are to provide simple, convenient and efficient means for adjusting the trough or trough-sections into proper alinement when said sections are first attached to the roofs of buildings, and for the ready adjustment of said trough and after it has been hung and has moved out of position, owing to the sagging of the roof, or for other causes.

In the accompanying drawing, which illustrates applications of my invention, Figure 1 is a part elevational and a part sectional view upon eaves-trough hanger constructed in accordance with my invention; and Fig. 2 a part plan and a part sectional view taken on line 2—2 of Fig. 1.

Referring to the drawing, I have shown two forms of eaves-trough hangers embodying my invention both comprising a bent hanger-rod comprising a portion 2 adapted to be secured to a roof and a vertically extending shank-portion 3. In the form of Fig. 1 the shank 3 is provided with a threaded portion 4 and is preferably formed with square or flat corners as indicated by 5 and particularly shown in the sectional view of Fig. 2. Mounted on the shank, I employ an adjustable nut 6 having internal screw-threads adapted to mesh with the threaded-portion 4 of the shank.

7 designates a curved trough-support provided at one of its ends with a sleeve 8. Sleeve 8 is adjustably mounted on the shank 3 and rests upon the nut 6. The interior of the sleeve is formed with flat corners corresponding with the flat faces 5 of the shank and coöperate therewith to prevent the trough-support from turning on the shank.

For the purpose of preventing the support 7 and the trough from being raised after the trough has been properly adjusted I provide the nut 6 with a projection or flange 9, and the support 7 with a socket or recess 10 adapted to receive the flange.

11 designates a trough designed to be held in the trough-support 7 as shown by Fig. 1. The upper inner end of the support 7 is provided with an engaging-hook 12 and its opposite end with an outwardly projecting hook 13.

14 designates a detachable clip adapted to engage the hook 13 and to be bent over the trough in the manner clearly shown by Fig. 1.

The trough, or a portion thereof, may be moved vertically, either upwardly or downwardly, by simply turning the adjustable nut upon which the sleeve 8 rests. This nut, being located to the side of the trough and under the sleeve or the trough-holder, is easily reached and the trough being in view of the person putting it up or adjusting the same, may be readily brought to the desired position.

What I claim is:

1. An eaves trough-hanger comprising a hanger-rod having a shank-portion, a nut mounted on the shank, a trough-support provided with a sleeve surrounding the shank and resting upon the nut, said sleeve and shank provided with coöperating means for preventing the sleeve from turning on the shank.

2. An eaves trough-hanger comprising a hanger-rod having a threaded shank-portion, an adjustable nut mounted on the threaded portion of the shank and provided with a flange, a trough-support formed with a recess to receive the flange of the nut, said support provided with a sleeve surrounding the shank and resting upon the nut, said sleeve and shank having coöperating means for preventing the sleeve turning on the shank.

In testimony whereof I affix my signature in presence of two witnesses.

CHARLES C. LA CLARE.

Witnesses:
NELLIE V. APPLEGATE,
W. G. DOOLITTLE.